(12) United States Patent
Lehmann et al.

(10) Patent No.: US 8,163,864 B2
(45) Date of Patent: Apr. 24, 2012

(54) SULFONATED POLYARYLENE COMPOUNDS, MEMBRANE MATERIAL MADE THEREFROM, METHOD FOR THE PRODUCTION THEREOF AND USE

(75) Inventors: Dieter Lehmann, Coswig (DE); Jochen Meier-Haack, Dresden (DE); Claus Vogel, Dresden (DE); Wladimir Butwilowski, Dresden (DE)

(73) Assignee: Leibniz-Institut fuer Polymerforschung Dresden E.V., Dresden (DE)

( * ) Notice: Subject to any disclaimer, the term of this patent is extended or adjusted under 35 U.S.C. 154(b) by 255 days.

(21) Appl. No.: 12/375,385

(22) PCT Filed: Jul. 13, 2007

(86) PCT No.: PCT/EP2007/057280
§ 371 (c)(1),
(2), (4) Date: Nov. 24, 2009

(87) PCT Pub. No.: WO2008/012222
PCT Pub. Date: Jan. 31, 2008

(65) Prior Publication Data
US 2011/0172317 A1    Jul. 14, 2011

(30) Foreign Application Priority Data
Jul. 28, 2006 (DE) .................. 10 2006 036 496

(51) Int. Cl.
*C08G 8/02* (2006.01)
(52) U.S. Cl. .......... 528/125; 528/27; 528/171; 528/295; 528/370; 528/373; 521/30

(58) Field of Classification Search .................. 525/125, 525/27, 171, 295, 370, 373; 521/30; 528/125, 528/27, 171, 295, 370, 373
See application file for complete search history.

(56) References Cited

U.S. PATENT DOCUMENTS

| 3,709,841 A | 1/1973 | Quentin |
| 5,071,448 A | 12/1991 | Bikson et al. |
| 5,438,082 A | 8/1995 | Helmer-Metzmann et al. |

(Continued)

FOREIGN PATENT DOCUMENTS

CN    1539804    10/2004

(Continued)

OTHER PUBLICATIONS

C. Wieser, "Novel Polymer Electrolyte Membranes for Automotive Applications Requirements and Benefits", Fuel Cells 2004, 4, pp. 245-250, 2004.

(Continued)

*Primary Examiner* — Randy Gulakowski
*Assistant Examiner* — Shane Fang
(74) *Attorney, Agent, or Firm* — Greenblum & Bernstein, PLC

(57) ABSTRACT

The invention relates to the field of polymer chemistry and relates to sulfonated polyarylene compounds such as can be used for example in ion exchange membranes in fuel cells, as well as a method for the production thereof and the use thereof. The object of the present invention is to disclose hydrolytically and thermally resistant sulfonated polyarylene compounds with a defined degree and position of sulfonation, from which membrane materials with an improved resistance to hydrolysis can be produced. The object is attained through sulfonated polyarylene compounds according to at least one of the general formulas (I)-(IV).

34 Claims, 1 Drawing Sheet

U.S. PATENT DOCUMENTS

| | | | |
|---|---|---|---|
| 5,561,202 | A | 10/1996 | Helmer-Metzmann et al. |
| 5,741,408 | A | 4/1998 | Helmer-Metzmann et al. |
| 6,214,488 | B1 | 4/2001 | Helmer-Metzmann et al. |
| 2002/0164513 | A1 | 11/2002 | Asano et al. |
| 2003/0044669 | A1 | 3/2003 | Hidaka et al. |
| 2004/0121211 | A1 | 6/2004 | Asano et al. |
| 2004/0197632 | A1 | 10/2004 | Sohma et al. |
| 2004/0265668 | A1 | 12/2004 | Okada et al. |
| 2005/0260474 | A1 | 11/2005 | Asano et al. |
| 2005/0260475 | A1 | 11/2005 | Asano et al. |
| 2006/0043344 | A1 | 3/2006 | Okada et al. |
| 2009/0203806 | A1* | 8/2009 | Liu et al. ............ 521/27 |

FOREIGN PATENT DOCUMENTS

| | | |
|---|---|---|
| DE | 19909841 | 9/2000 |
| DE | 10201691 | 9/2002 |
| DE | 10296599 | 4/2004 |
| EP | 0574791 | 12/1993 |
| EP | 1274147 | 1/2003 |
| EP | 1420473 | 5/2004 |
| EP | 1479714 | 11/2004 |
| EP | 1630187 | 3/2006 |
| FR | 2214675 | 8/1974 |
| GB | 1258851 | 12/1971 |
| JP | 2005060484 * | 3/2005 |
| WO | 03030289 | 4/2003 |

OTHER PUBLICATIONS

N. Comet et al., Sulfonated polyimide membranes: a new type of ion-conducting membrane for electrochemical applications. Journal of New Materials for Electrochemical Systems 3, 2000, pp. 33-42.

G. Meier et al., "Ex situ hydrolytic degradation of sulfonated polyimide membranes for fuel cells", Polymer 47, 2006, pp. 5003-5011.

E. Faughanel, Organilcum, Organisch-chemisches Grundpraktikum, 22 Ed., Wiley-VCH Verlag GmbH Weinheim 2004, ISBN 3-527-31148-3.

Blanco et al., "Sulfonation of Polysulfones: Suitability of the Sulfonated Materials for Asymmetric Membrane Preparation", Journal of Applied Polymer Science, vol. 84, pp. 2461-2473, 2002.

C. Vogel et al., On the Stability of Selected Monomeric and Polymeric Aryl Suifonic Acids on Healing in Water (Part 1), Fuel Cells 2004, 4, pp. 320-327, 2004.

J. Yu et al., "Degradation mechanism of polystyrene sulfonic acid membrane and application of its composite membranes in fuel cells", Phys. Chem. Chem. Phys. 5, pp. 611-615, 2003.

B. Lafitte et al., "Proton Conducting Polysulfone Ionomers Carrying Sulfoaryloxybenzoyl Side Chains", Macromol. Rapid Commun., 26, pp. 1464-1468, 2005.

S. Chen et al., "Synthesis and properties of novel side-chain-sulfonated polyimides from bis [4-(4-aminophenoxy)-2- (3-sulfobenzoyl)]phenyl sulfone", Polymer 47, pp. 2660-2669, 2006.

G. Meier et al., "Ex situ hydrolytic degradation of sulfonated polyimide membranes for fuel cells", Polymer 47, pp. 5003-5011, 2006.

H. Ghassemi et al., "New multiblock copolymers of sulfonated poly(4'-phenyl-2,5-benzophenone) and poly(arylene ether sulfone) for proton exchange membranes. II", Polymer 45, pp. 5855-5862, 2004.

M. Gieselman et al., "Water-soluble polybenzimidazole-based polyelectrolytes", Macromolecules, 25, pp. 4832-4834, 1992.

H. Kricheldorf, "New Polymer Syntheses. 58. Alkylation of Aromatic Poly(pyridine ether)s and Their Application as Membranes", Macromolecules 1992, 25, pp. 1382-1386, 1992.

H. Kricheldorf, "Copolymerization of Srcosine-NCA and L-Leucine-NCA or L-phenylalanine-NCA", Makromol. Chem., MacromoL Symp. 42/43, pp. 313-328, 1991.

Database CA [Online] Chemical Abstracts Service, Columbus, Ohio, US; Meng, Yuezhong et al. "Synthesis and application of sulfonated polyarylether from diphenylmethylenebis-(dimethyl)phenol" XP002461844 found in STN Database accession No. 2005:513955, 2005.

Savadogo O: "Emerging Membranes for Electrochemical Systems: (I) Solid Polymer Electrolyte Membranes for Fuel Cell Systems" Journal of New Materials for Electrochemical Systems, Ecole Polytechnique De Montreal, Montreal, CA, vol. 1, 1998, pp. 47-66, XP009014846 ISSN: 1480-2422.

C. Wieser, "Novel Polymer Electrolyte Membranes for Automotive Applications Requirements and Benefits", Fuel Cells 2004, 4, pp. 245-250, 2004.

* cited by examiner

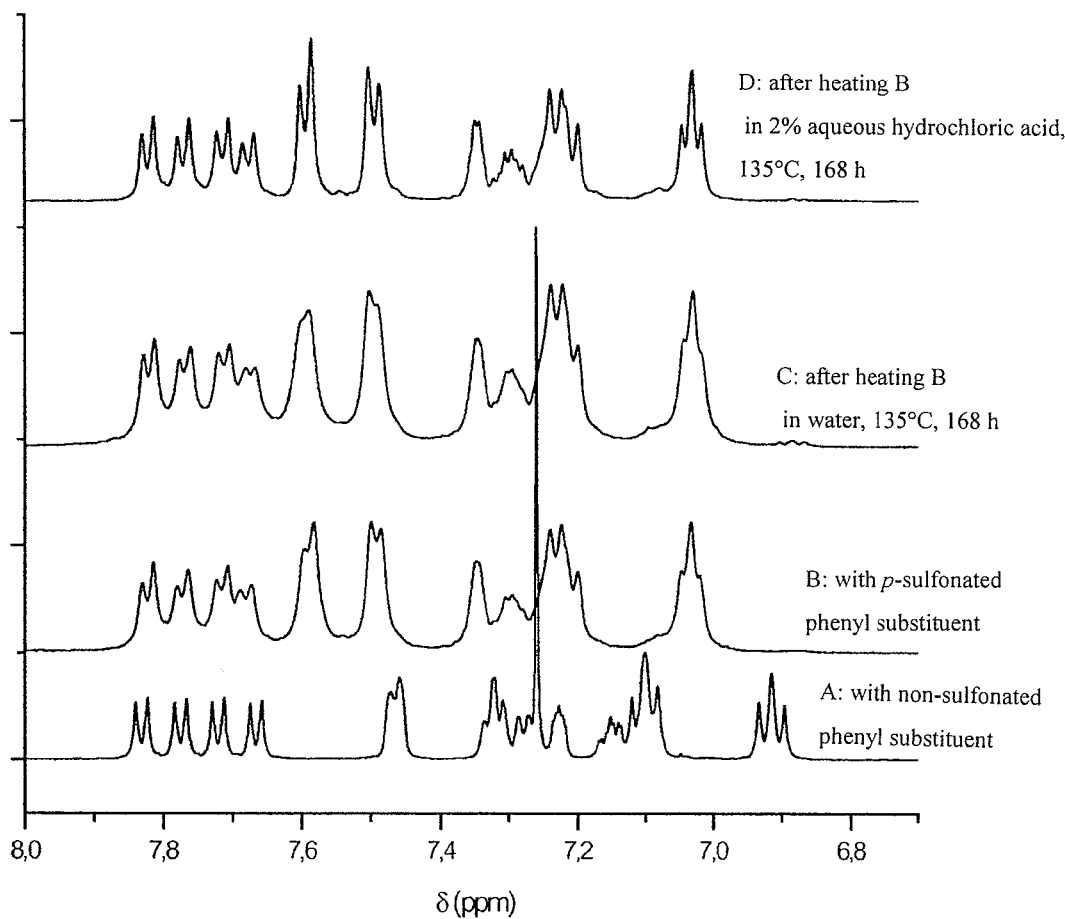

SULFONATED POLYARYLENE COMPOUNDS, MEMBRANE MATERIAL MADE THEREFROM, METHOD FOR THE PRODUCTION THEREOF AND USE

CROSS-REFERENCE TO RELATED APPLICATION

The present application is a National Stage of PCT/EP2007/057280, filed Jul. 13, 2007, the disclosure of which is hereby expressly incorporated by reference in its entirety. The present application claims priority under 35 U.S.C. §119 of German Patent Application No. 10 2006 036 496.1, filed Jul. 28, 2006.

BACKGROUND OF THE INVENTION

1. Field of the Invention

The invention relates to the field of polymer chemistry and relates to sulfonated polyarylene compounds, such as can be used, for example, in ion exchange membranes in fuel cells or other electrochemical processes or as low-fouling membranes for nanofiltration, ultrafiltration or microfiltration or reverse osmosis, as well as a method for the production thereof and use thereof.

2. Discussion of the Background Information

Among the known fuel cell types the acid polymer electrolyte fuel cell (PEM) is characterized by a high power density and a favorable ratio of power to weight. Membranes of poly(perfluoroalkyl sulfonic acids) such as, e.g., Nafion® (DuPont) are currently considered to be standard membranes due to their high chemical stability and high conductivity. The disadvantages of these membranes are the limitation of the operating temperature to a maximum of 80-90° C. and the currently still very high price. However, a higher operating temperature is desirable, since the electrode kinetics are favorably influenced, catalyst poisons such as carbon monoxide desorb more quickly and the cooling requires a lower expenditure (C. Wieser, Fuel Cells 4, 245 (2004)). Furthermore, the poly(perfluoroalkyl sulfonic acids) have a high methanol permeability, which excludes them from use in DMFC (direct methanol fuel cells).

Sulfonated polyaryl compounds are being intensively studied as alternative materials for fuel cell membranes. Poly(ether ketone)s (PEK, PEEK) and poly(ether sulfone)s (PES, PEES) are particularly favored thereby. Other sulfonated high-performance polymers such as polyimides have likewise been examined (N. Cornet et al., J. New Mater. Electrochem. Syst. 3, 33-42 (2000)). However, these are not suitable for use as fuel cell membranes in terms of their chemical stability (G. Meier et al., Polymer 47, 5003-5011 (2006)).

Sulfonation is carried out in most cases at the main chain on electron-rich aromatics. However, it is generally known that the sulfonation of aromatics is reversible and is promoted by electron donor substituents (e.g., ether groups), high temperatures and acidic media (Organikum, 22 ed., Wiley-VCH Verlag GmbH Weinheim 2004, ISBN 3-527-31148-3). Furthermore, it has been reported that the sulfonation of the polymer main chain leads to a destabilization and thus to a reduction of the molar mass and reduction of the mechanical properties (J. F. Blanco et al., J. Appl. Polym. Sci. 84, 2461-2473 (2002)).

On the other hand, it was found that the sulfonic acid group in poly(styrene sulfonic acid) is resistant to hydrolysis in water up to approx. 200° C. (C. Vogel et al., Fuel Cells, 4, 320-327 (2004)). However, poly(styrene sulfonic acid) cannot be used in fuel cells due to its oxidation sensitivity (J. Yu et al., Phys. Chem. Chem. Phys. 5, 611-615 (2003)).

Polymer fuel cell membranes with sulfonated aromatic side chain have likewise been described. The object thereby is to support the microphase separation between hydrophobic main chain and hydrophilic elements (sulfonic acid groups). It is expected that the swelling of the membranes in water will be minimized by the inserted spacers between polymer main chain and sulfonic acid group.

Lafitte et al. converted a polysulfone on bisphenol-A basis with the cyclic anhydride of the 2-sulfobenzoic acid and other electrophiles in a two-stage and multiple-stage reaction (B. Lafitte et al., Macromol. Rapid Commun. 23, 896-900 (2002) and ibid 26, 1464-1468 (2005)). In the first stage, an activation of the polymer occurs through conversion with butyllithium. The second stage comprises the conversion of the activated polymer with 2-sulfobenzoic anhydride or fluorobenzyl chloride. The latter is converted in a further step in a nucleophilic reaction with a hydroxyaryl sulfonic acid. The disadvantage of this method is the sensitivity of the reactants (BuLi, activated polymer) to contaminants (e.g., water, oxygen, carbon dioxide) and the subsequent reactions associated therewith and the poor control of the degree of sulfonation and the relatively high price of butyllithium.

Chen et al. described polyimide sulfones with sulfobenzoyl side groups (S. Chen et al., Polymer 47, 2660-2669 (2006)). In this study, dichlorodiphenyl sulfone was first carboxylated in a multiple-stage reaction (BuLi+$CO_2$), then converted into the acid chloride and converted by a Friedel-Crafts acylation with benzene to the benzoyl derivative. The sulfonation of this monomer was carried out with oleum (30% $SO_3$) at 75° C. The sulfonated polymers are obtained via further conversions with 1.) aminophenol and 2.) naphthalenetetracarboxylic acid anhydride. This method is very complex and cost-intensive, especially as a total yield of only 50% was achieved in the production of the sulfonated monomers. Furthermore, it is known that polyimides are not stable under fuel cell conditions (G. Meier et al., Polymer 47, 5003-5011 (2006)).

Ghassemi et al. described a block copolymer based on poly(phenylene sulfone) and poly(4'-phenyl-2,5-benzophenone) that is sulfonated exclusively in the phenyl benzophenone side chain (H. Ghassemi et al., Polymer 45, 5855-5862 (2004)). No information was given on the hydrolytic stability of these products.

Gieselmann et al. presented side groups sulfonated polybenzimidazoles (M. Gieselman et al., Macromolecules, 25, 4832-4834 (1992)) in order to improve the solubility of these polymers. The modification was carried out by alkylation of the NH nitrogen of the imidazole ring in a two-stage reaction 1.) deprotonation of the NH nitrogen with a strong base (LiH) and subsequent conversion with 1,3-propane sultone or benzyl bromide sulfonic acid.

SUMMARY OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values within that range. For example, if a range is from about 1 to about 50, it is deemed to include, for example, 1, 7, 34, 46.1, 23.7, or any other value within the range.

The present invention provides hydrolytically and thermally resistant sulfonated polyarylene compounds with defined degree and position of sulfonation, from which membrane materials with an improved resistance to hydrolysis can be produced, and to disclose a simple and more cost-effective production method thereof.

The hydrolytically and thermally resistant sulfonated polyarylene compounds can be used in ion exchanger membranes for fuel cells or other electrochemical processes or as a nanofiltration membrane or as an ultrafiltration membrane or as a microfiltration membrane or as a reverse osmosis membrane.

The sulfonated polyarylene compounds according to the invention are built up according to at least one of the general formulas (I)-(IV),

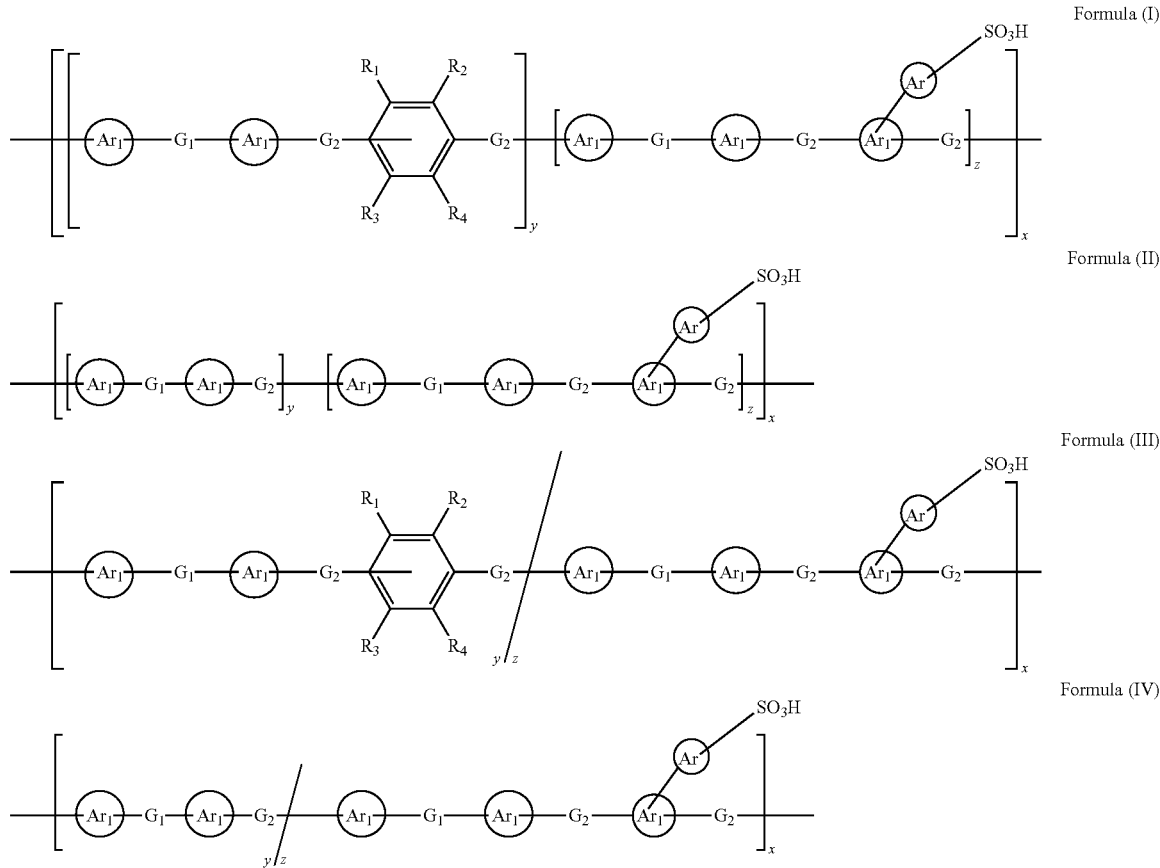

Formula (I)

Formula (II)

Formula (III)

Formula (IV)

and wherein:
$Ar_1$ are uninuclear and/or multinuclear aromatics and
$G_1$ is a group with electron acceptor properties and
$G_2$ is an ether and/or sulfide and/or keto and/or sulfonyl and/or phenylphosphine oxide and/or sulfoxide group and
$R_1, R_2, R_3, R_4$ are substituents or $R_1$ through $R_4$ equals hydrogen or at least one radical $R_1$ through $R_4$ not equal to hydrogen and this is a substituent and
$y \geq 0$ and $z \geq 1$ and $x \geq 5$ and
Ar=are one or more uninuclear and/or multinuclear aromatics and/or one or more biphenyls,
and sulfonic acid groups are bound at least to the "Ar" aromatic groups that form the side chains.

The compounds may include those wherein
$Ar_1$ is a phenyl unit and/or a naphthyl unit, and
$G_1$ is a sulfonyl group and/or a keto group and/or a phenylphosphine group.

The compounds may comprise those wherein y is $\geq 2$ and even $y \geq 4$.

It is also contemplated that z is $\geq 2$ and even $z \geq 4$.

Furthermore, x is $\geq 10$ and even $x \geq 20$.

Compounds according to the present invention include those wherein Ar is at least one phenyl radical and/or at least one naphthyl radical.

In embodiments, the sulfonic acid groups are bound exclusively to the "Ar" aromatic groups.

In further embodiments, the polyarylene compounds chiefly have a block structure. Furthermore, in embodiments, the polyarylene compounds have a random or a pure block structure.

In embodiments, the "Ar" aromatic groups are bound as side chain directly covalently to a uninuclear or multinuclear aromatic of the main chain.

Furthermore in embodiments, a membrane material comprises at least one sulfonated polyarylene compound.

In embodiments, at least one further polymer comprising aromatic monomer units that are linked via sulfide and/or sulfoxide and/or sulfonyl and/or ether and/or keto and/or methylene and/or isopropyl and/or hexafluoroisopropyl and/or phenylphosphine oxide and/or imidazole and/or oxazole and/or thiazole and/or quinoxaline and/or quinoxazole groups is contained thereby.

And furthermore, the aromatic monomer units can be substituted.

With the method according to the invention for producing sulfonated polyarylene compounds, at least mono-aryl-substituted 1,4-dihydroxybenzenes/hydroquinones and/or 1,4-dihydroxynaphthalenes as aryl monomers with an "Ar" aromatic group together with dihalogen aromatics are polymerized to form aryl compounds and subsequently sulfonic acid groups bound at least to the aromatic "Ar" groups.

In embodiments, phenylhydroquinone and/or naphthyl hydroquinone and/or anthracenyl hydroquinone and/or 2,5-diphenyl hydroquinone and/or biphenylyl hydroquinone and/or 2,5-bis-biphenylyl hydroquinone and/or tetraphenyl hydroquinone and/or 1,4-dihydroxy-2-phenylnaphthalene and/or 1,4-dihydroxy-2-naphthylnaphthalene are used as aryl monomers.

Likewise in some embodiments, the aryl monomers are polymerized in solution to form aryl polymers with aromatic "Ar" groups as side chain.

Also in some embodiments, the aryl monomers are polymerized in melt to form aryl polymers with aromatic "Ar" groups as side chain.

In some embodiments, further aryl monomers without an aromatic "Ar" group as side chain are integrated in the polymer chain of the polyarylene compounds.

In some embodiments, bisphenols or further 1,4-dihydroxybenzenes/hydroquinones and/or 1,4-dihydroxynaphthalenes as aryl monomers without an aromatic "Ar" group are used as further aryl monomers without an aromatic "Ar" group as side chain, which may be used as 4,4'-dihydroxybenzophenone and/or 3,4'-dihydroxybenzophenone and/or 2,4'-dihydroxybenzophenone and/or 2,2'-dihydroxybenzophenone and/or 4,4'-dihydroxydiphenyl sulfone and/or 3,4'-dihydroxydiphenyl sulfone and/or 2,4'-dihydroxydiphenyl sulfone and/or 2,2'-dihydroxydiphenyl sulfone and/or 2,2-(bis-4-hydroxyphenyl)hexafluoropropane.

In some embodiments, difluorodiphenyl sulfone and/or difluorobenzophenone and/or bis-(4-fluorophenyl)phosphine oxide and/or bis-(4-fluorobenzoyl)benzene or dichlorodiphenyl sulfone and/or dichlorobenzophenone are used as dihalogen aromatics.

In some embodiments, the aryl polymers with "Ar" aromatic groups as side chain are sulfonated through the addition of the polymers to a sulfonating agent.

In some embodiments, the aryl polymers with aromatic "Ar" groups as side chain are dissolved in an inert solvent and sulfonated with a sulfonating agent, wherein it is particularly preferred if sulfuric acid or oleum or chlorosulfuric acid or chlorosulfuric acid trimethylsilyl ester or acetyl sulfate or an $SO_3$-triethyl phosphite adduct is used as sulfonating agent. It is furthermore of particular preference if the sulfonating agent is sulfuric acid and the sulfonation is carried out at room temperature and during a reaction time of 1 to 8 hours, including during a time of 2 to 4 hours.

In some embodiments, the sulfonating agent is used dissolved in an inert solvent, wherein advantageously chloroform or dichloromethane or dichloroethane or tetrachloroethane is used as solvent.

In some embodiments, chlorosulfuric acid trimethylsilyl ester is used as sulfonating agent.

In some embodiments, the sulfonating reaction is carried out at a temperature of 25° C. to 100° C., preferably at a temperature of 25° C. to 50° C.

In some embodiments, less stable or unstable, i.e., cleavable/hydrolyzable groups may be cleaved by a reverse reaction during a post-treatment.

According to the invention a membrane may be produced from the sulfonated polyarylene compounds.

Also according to the invention the sulfonated polyarylene compounds may be used as membrane material.

In some embodiments, they are used as membrane material for ion exchange membranes for fuel cells or other electrochemical processes or as a nanofiltration membrane or as an ultrafiltration membrane or as a microfiltration membrane or as a reverse osmosis membrane.

According to one aspect of the invention, starting materials for membrane materials are produced in a simple and cost-effective manner, which also show clear improvements in the properties.

One advantage of the invention is that the glass-transition temperature of the sulfonated polyarylene compounds according to the invention on the basis of hydroquinone and/or bisphenol-A and/or dihydroxybiphenyl is much higher as compared to PEEK and PES.

With the chemical structure of the polymer materials according to the invention, the position and the degree of sulfonation can be adjusted in a targeted manner. The resistance to hydrolysis is clearly increased compared to the prior art.

The production method according to the invention is very cost-effective, since commercial monomers can be used. Alternatively to the compounds given in the examples, free bisphenols and dichloro aromatics can also be used, which likewise makes the polymers according to the invention much cheaper. However, a reaction temperature of 190-200° C. must then be chosen.

Membranes from the sulfonated polyarylene compounds according to the invention exhibit a much lower methanol permeability compared to the prior art, in particular Nafion, without deteriorating other properties, which predestines these membranes in particular for use in the DMFC.

The invention is explained in more detail below based on several exemplary embodiments.

The meanings thereby are as follows:
DMAc=N,N-dimethyl acetamide
GPC-gel permeation chromatography
$M_w$=molar mass in (g/mol) (weight average)
$M_n$=molar mass (g/mol) (number average)
$\eta_{inh.}$-inherent viscosity (dl/g)
IEC=ion exchange capacity in mmol/g(polymer); measurement for the degree of sulfonation
$T_g$: glass-transition temperature (° C.)
c=concentration in g/l PVP=polyvinylpyrrolidone NMR spectra were taken of all of the samples given in the examples in order to determine the degree of sulfonation and the position of sulfonation. By way of example, the spectra of the sample from example 4 are shown.

BRIEF DESCRIPTION OF THE DRAWING

The FIGURE depicts 1H-NMR spectra (aromatic region) for example 4, Poly(oxy-1,4-(2-phenyl)phenyleneoxy-1,4-phenylene-carbonyl-1,4-phenylene), an example with a structure according to formula I where y=0, and $Ar_1$=p-phenylene group (with 1,4-positioned groups $G_1$ and $G_2$) Ar=phenyl group, 2-position on 1,4 disubst. phenyl group $Ar_1$ of the main chain without sulfonic acid group (substance A)—spectrum A; with para-positioned sulfonic acid group (substance B)—spectra B, C, D $G_1$—CO (keto group) $G_2$=O (ether bridge)

DETAILED DESCRIPTION OF THE INVENTION

Example 1

26.18 g (120 mmol) 4,4'-difluorodiphenyl sulfone, 17.76 g (45 mmol) 4,4'-bis-trimethylsiloxy-diphenyl sulfone and 24.766 g (75 mmol) 2,5-bis-trimethylsiloxy biphenyl (phenylhydroquinone-bis-trimethylsilyl ether) are weighed into a 500 ml 3-neck round-bottom flask with the exclusion of moisture and 250 ml anhydrous N-methyl-2-pyrrolidone is added. The monomers are dissolved under a light argon stream and 24.88 g (180 mmol) anhydrous potassium carbonate is added to the reaction solution. The reaction batch is heated to 175° C. and kept at this temperature for 24 h. After cooling to room temperature, the solution is filtered in order to separate undissolved matter (salts), and then the polymer is precipitated in 2-propanol. The polymer is dissolved in chloroform and any undissolved components are separated by filtration. The polymer is precipitated in 2-propanol, carefully washed first with 2-propanol and subsequently with methanol and dried in vacuum at 80° C. to constant weight.

The sulfonation is carried out by dissolving the polymer in concentrated sulfuric acid (96-98%) and stirring for 4 hours at 25° C. The sulfonation product is precipitated by pouring the sulfuric acid solution into cold water. After thorough washing with cold water (to pH 7 of the washings), the product is dried in vacuum at 80° C. to constant weight.

The degree of sulfonation was determined titrimetrically.
Properties:

$\eta_{inh}$: 0.39 dl/g (measured in DMAc (25°C); c = 2 g/l)
GPC: $M_w$ = 58000; $M_n$ = 24000; $Mw/M_n$ = 2.4
(DMAc + 2% water 3 g/l LiCl; PVP standards for calibration)
$IEC_{theo}$: 1.33 mmol/g    $IEC_{titrated}$: 1.35 mmol/g
Tg: 229 °C
Water absorption: 22% (Nafion 117: 25%)
Methanol diffusion: $1.8 \times 10^{-6}$ cm$^2$/sec (Nafion 117: $8.9 \times 10^{-6}$ cm$^2$/sec)

Example 2

30.51 g (120 mmol) 4,4'-difluorodiphenyl sulfone, 11.84 g (30 mmol) 4,4'-bis-trimethylsiloxy-diphenyl sulfone and 29.71 g (90 mmol) 2,5-bis-trimethylsiloxy-biphenyl (phenyl-hydroquinone-bis-trimethylsilyl ether) are weighed with the exclusion of moisture into a glass reactor. The monomers are dissolved at a temperature of 130° C. under a light argon stream and while being stirred. After the addition of 100 mg CsF, the temperature is gradually increased over a period of 10 hours to 300° C. At the final temperature the reaction is continued for one hour under vacuum without stirring. After cooling to room temperature, the polymer is dissolved in 200 ml chloroform, and 18.5 ml (120 mmol) chlorosulfuric acid trimethylsilyl ester, dissolved in 50 ml chloroform, is subsequently added to the solution with vigorous stirring and the resulting mixture was stirred for 24 h at 50° C. The product is precipitated in water/2-propanol 1:9, washed with water and dried in vacuum at 80° C. until constant weight.
Properties:

$\eta_{inh}$: 0.41 dl/g (DMAc 25°C; c = 2 g/l)
GPC: $M_w$ = 71000; $M_n$ = 30000; $M_w/M_n$ = 2.4
(DMAc + 2% water 3 g/l LiCl; PVP standards for calibration)
$IEC_{theo}$: 1.58 mmol/g    $IEC_{titrated}$: 1.54 mmol/g
Tg: 225°C
Water absorption: 26% AT 25°C (Nafion 117: 25%)
Methanol diffusion (75°C): $3.8 \times 10^{-6}$ cm$^2$/sec
(Nafion 117: $8.9 \times 10^{-6}$ cm$^2$/sec)

Example 3

26.18 g (120 mmol) 4,4'-difluorobenzophenone, 21.52 g (60 mmol) bis-4,4'-trimethylsiloxybenzophenone and 19.83 g (60 mmol) 2,5-bis-trimethylsiloxybiphenyl (phenylhydroquinone-bis-trimethylsilyl ether) are weighed with the exclusion of moisture into a 500 ml 3-neck round-bottom flask and 250 ml anhydrous N-methyl-2-pyrrolidone is added. The monomers are dissolved under a light argon stream and 24.88 g (180 mmol) anhydrous potassium carbonate is added to the reaction solution. The reaction batch is heated to 175° C. and kept at this temperature for 24 h. After cooling to room temperature, the solution is filtered in order to separate undissolved matter (salts), and then the polymer is precipitated in 2-propanol. The polymer is dissolved in chloroform and any undissolved components separated by filtration. The polymer is precipitated in 2-propanol, carefully washed first with 2-propanol and subsequently with methanol and dried in vacuum at 80° C. to constant weight.

The sulfonation occurs by dissolving the polymer in concentrated sulfuric acid (96-98%) and stirring for 4 hours at 25° C. The sulfonation product is precipitated by pouring the sulfuric acid solution into cold water. After thorough washing with cold water (to pH 7 of the washings), the product is dried in vacuum at 80° C. to constant weight.
Properties:

$\eta_{inh}$: 0.63 dl/g (DMAc 25°C; c = 2 g/l)
GPC: $M_w$ = 62000; $M_n$ = 16000; $M_w/M_n$ = 3.88
(DMAc + 2% water 3 g/l LiCl; PVP standards for calibration)
$IEC_{theo}$: 1.17 mmol/g    $IEC_{titrated}$: 1.13 mmol/g
Tg: 135°C Example 4

6.6115 g (30.3 mmol) 4,4'-difluorobenzophenone, 9.917 g (30 mmol) 2,5-bis-trimethylsiloxybiphenyl (phenylhydroquinone-bis-trimethylsilyl ether) are weighed with the exclusion of moisture into a 100 ml 3-neck round-bottom flask and 50 ml anhydrous N-methyl-2-pyrrolidone is added. The monomers are dissolved under a light argon stream, and 4.146 g (30 mmol) anhydrous potassium carbonate is added to the reaction solution. The reaction batch is heated to 175° C. and kept at this temperature for 24 h. After cooling to room temperature, the solution is filtered in order to separate undissolved matter (salts), and then the polymer is precipitated in 2-propanol. The polymer is dissolved in chloroform, and any undissolved components separated by filtration. The polymer is precipitated in 2-propanol, carefully washed first with 2-propanol and subsequently with methanol and dried in vacuum at 80° C. to constant weight.

The sulfonation is carried out by dissolving the polymer in concentrated sulfuric acid (96-98%) and stirring for 4 hours at 25° C. The sulfonation product is precipitated by pouring the sulfuric acid solution into cold water. After thorough washing with cold water (to pH 7 of the washings), the product is dried in vacuum at 80° C. until constant weight.

Properties:

---

$\eta_{inh}$: 0.40 dl/g (DMAc 25°C; c = 2 g/l)
GPC: $M_w$ = 120700; $M_n$ = 32000; $M_w/M_n$ = 3.77
(DMAc + 2% water 3 g/l LiCl; PVP standards for calibration)
$IEC_{theo}$: 2.24 mmol/g    $IEC_{sulfonation\ degree}$: 2.2 mmol/g
Tg: 168°C

---

Example 5

Production of the Membranes 10 g of the sulfonated polymer from example 1, 2 or 3 is dissolved in 100 ml N-methyl-2-pyrrolidone at 25° C. and filtrated via a glass fit G4. The solution is degassed by the application of a vacuum. Once the solution is free of bubbles, it is spread on a glass plate with the aid of a doctor blade to form a film 700 μm thick. The solvent is first evaporated for 8 hours at 80° C. and normal pressure and subsequently for 8 hours at a pressure of 100 mbar and 80° C. To fully dry, the film is thermally treated for 24 h in the oil pump vacuum at 120° C. The membrane is detached by placing the cooled glass plate in water and freed from soluble constituents for 24 hours in distilled water, the water being changed several times. To dry it, the membrane is pressed between two metal plates and dried at 80° C. in vacuum to constant weight. The film thickness is approx. 70 μm.

Example 6

5941 The resistance to hydrolysis of the sulfonated material was tested by treating the membranes produced according to example 5 in water or diluted aqueous mineral acids (2% HCl) at 135° C. over a period of 168 h. A comparison of the 1H-NMR spectra of the samples before and after the thermal treatment showed no differences.

The invention claimed is:

1. Sulfonated polyarylene compounds according to at least one of the general formulas (I)-(IV)

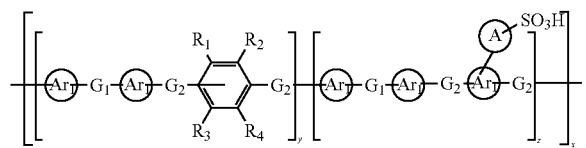

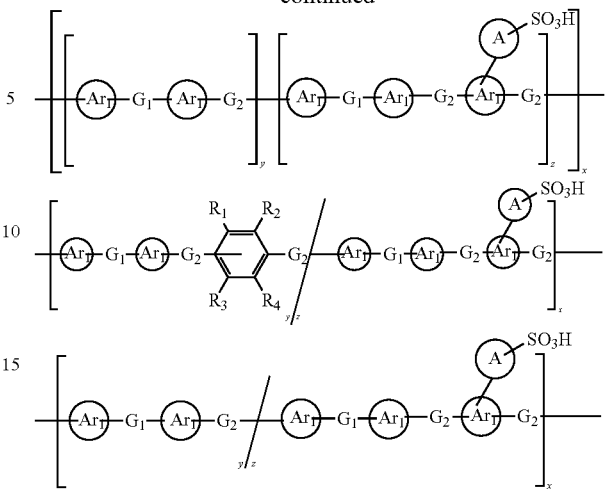

and wherein:
$Ar_1$ are uninuclear and/or multinuclear aromatics and
$G_1$ is a group with electron acceptor properties and
$G_2$ is an ether and/or a sulfide and/or a ketone and/or a sulfone and/or a phenyl phosphinoxide and/or a sulfoxide group, wherein if $G_2$ is an ether group, Ar is more than one uninuclear aromatic or one or more multinuclear aromatics and
$R_1$, $R_2$, $R_3$, $R_4$ are substituents or $R_1$ through $R_4$ equals hydrogen or at least one radical $R_1$ through $R_4$ not equal to hydrogen and this is a substituent and
$y \geq 0$ and $z \geq 1$ and $x \geq 5$ and
Ar=are one or more uninuclear and/or multinuclear aromatics and/or one or more biphenyls,
and sulfonic acid groups are bound at least to the "Ar" aromatic groups that form the side chains.

2. Sulfonated polyarylene compounds according to claim 1, in which
$Ar_1$ is a phenyl unit and/or a naphthyl unit,
and
$G_1$ is a sulfone group and/or a ketone group and/or a phenylphosphine group.

3. Sulfonated polyarylene compounds according to claim 1, in which $y \geq 2$.

4. Sulfonated polyarylene compounds according to claim 1, in which $z \geq 2$.

5. Sulfonated polyarylene compounds according to claim 1, in which $x \geq 10$.

6. Sulfonated polyarylene compounds according to claim 1, in which Ar is at least one phenyl radical and/or at least one naphthyl radical.

7. Sulfonated polyarylene compounds according to claim 1, in which $y \geq 4$.

8. Sulfonated polyarylene compounds according to claim 1, in which $z \geq 4$.

9. Sulfonated polyarylene compounds according to claim 1, in which $x \geq 20$.

10. Sulfonated polyarylene compounds according to claim 1, in which the sulfonic acid groups are bound exclusively to the "Ar" aromatic groups.

11. Sulfonated polyarylene compounds according to claim 1, in which the polyarylene compounds chiefly have a block structure.

12. Sulfonated polyarylene compounds according to claim 1, in which the polyarylene compounds have a random or a pure block structure.

13. Sulfonated polyarylene compounds according to claim 1, in which the "Ar" aromatic groups are bound as side chain directly covalently to a uninuclear or multinuclear aromatic of the main chain.

14. A method for producing the sulfonated polyarylene compounds of claim 1, in which at least Ar-substituted hydroquinones and/or Ar-substituted 1,4-dihydroxynaphthalenes as aryl monomers together with dihalogen aromatics are polymerized to form arylene compounds and subsequently sulfonic acid groups bound at least to the aromatic "Ar" groups.

15. The method according to claim 14, in which naphthyl hydroquinone and/or anthracenyl hydroquinone and/or 2,5-diphenyl hydroquinone and/or biphenylyl hydroquinone and/or 2,5-bis-biphenylyl hydroquinone and/or tetraphenyl hydroquinone and/or 1,4-dihydroxy-2-phenylnaphthalene and/or 1,4-dihydroxy-2-naphthylnaphthalene are used as aryl monomers.

16. The method according to claim 14, in which the aryl monomers are polymerized in solution to form arylene polymers with "Ar" aromatic groups as side chain.

17. The method according to claim 14, in which the aryl monomers are polymerized in melt to form arylene polymers with "Ar" aromatic groups as side chain.

18. The method according to claim 14, in which further aryl monomers without an aromatic "Ar" group as side chain are integrated in the polymer chain of the polyarylene compounds.

19. The method according to claim 18, in which bisphenols or further hydroquinones and/or 1,4-dihydroxynaphthalenes as aryl monomers without an aromatic "Ar" group are used as further aryl monomers without an aromatic "Ar" group as side chain.

20. The method according to claim 19, in which 4,4'-dihydroxybenzophenone and/or 3,4'-dihydroxybenzophenone and/or 2,4'-dihydroxybenzophenone and/or 2,2'-dihydroxybenzophenone and/or 4,4'-dihydroxydiphenylsulfone and/or 3,4'-dihydroxydiphenylsulfone and/or 2,4'-dihydroxydiphenylsulfone and/or 2,2'-dihydroxydiphenylsulfone and/or 2,2-(bis-4-hydroxyphenyl)hexafluoropropane are used as bisphenols.

21. The method according to claim 14, in which difluorodiphenylsulfone and/or difluorobenzophenone and/or bis-(4-fluorophenyl)phosphinoxide and/or bis-(4-fluorobenzoyl) benzene or dichlorodiphenyl sulfone and/or dichlorobenzophenone are used as dihalogen aromatics.

22. The method according to claim 14, in which the arylene polymers with "Ar" aromatic groups as side chain are sulfonated through the addition of the polymers to a sulfonating agent.

23. The method according to claim 14, in which the arylene polymers with aromatic "Ar" groups as side chain are dissolved in an inert solvent and sulfonated with a sulfonating agent.

24. The method according to claim 22, in which sulfuric acid or oleum or chlorosulfuric acid or chlorosulfuric acid trimethylsilyl ester or acetyl sulfate or an $SO_3$-triethylphosphite addition compound is used as sulfonating agent.

25. The method according to claim 24, in which the sulfonating agent is sulfuric acid and the sulfonation is carried out at room temperature and during a reaction time of 1 to 8 hours.

26. The method according to claim 25, in which the reaction is carried out during a time of 2 to 4 hours.

27. The method according to claim 23, in which the sulfonating agent is used dissolved in an inert solvent.

28. The method according to claim 27, in which chloroform or dichloromethane or dichloroethane or tetrachloroethane is used as solvent.

29. The method according to claim 23, in which chlorosulfuric acid trimethylsilyl ester is used as sulfonating agent.

30. The method according to claim 29, in which the sulfonation reaction is carried out at a temperature of 25° C. to 100° C.

31. The method according to claim 29, in which the sulfonation reaction is carried out at a temperature of 25° C. to 50° C.

32. The method claim 14, in which through aftertreatment unstable sulfonic acid groups are cleaved.

33. A membrane material comprising the sulfonated polyarylene compound according to claim 1.

34. The membrane material according to claim 33 which is employed as a membrane material for ion exchanger membranes for fuel cells or other electrochemical processes or as a nanofiltration membrane or as an ultrafiltration membrane or as a microfiltration membrane or as a reverse osmosis membrane.

* * * * *